T. D. SMITH.
Butter Worker and Mold.
No. 56,112.
Patented July 3, 1866.
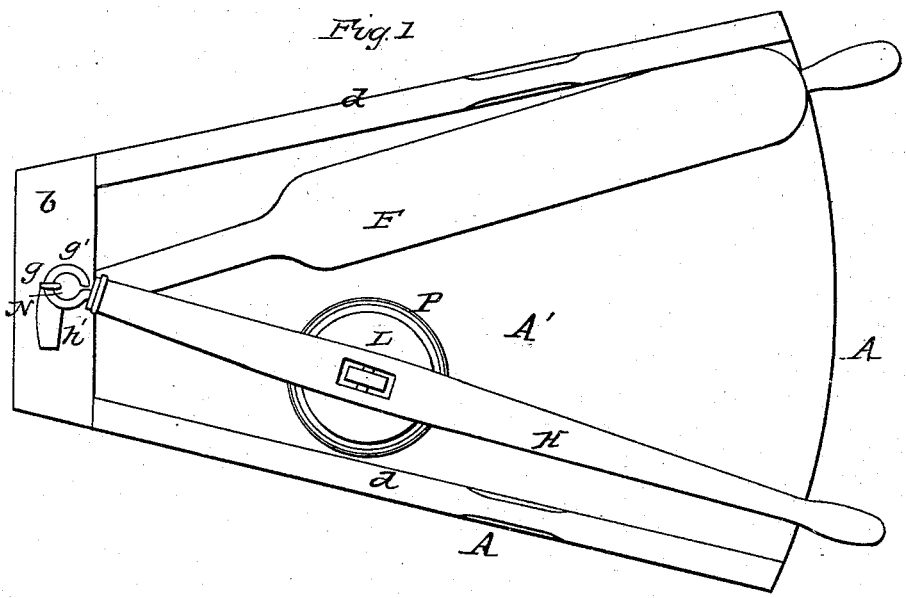
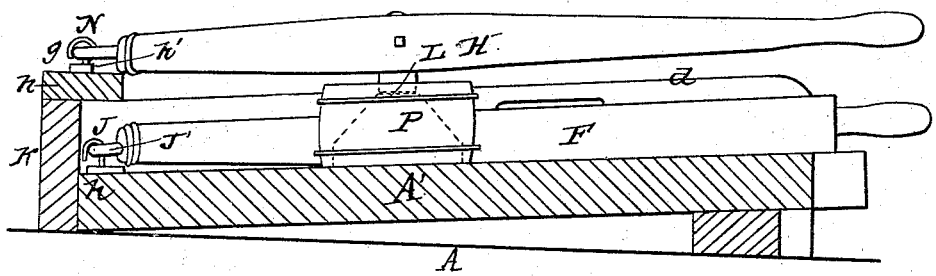
WITNESSES
W. H. Burridge
E. E. Waite
INVENTOR
T. D. Smith

UNITED STATES PATENT OFFICE.

T. D. SMITH, OF INDEPENDENCE, OHIO.

IMPROVEMENT IN BUTTER WORKER AND MOLD.

Specification forming part of Letters Patent No. 56,112, dated July 3, 1866.

*To all whom it may concern:*

Be it known that I, T. D. SMITH, of Independence, in the county of Cuyahoga and State of Ohio, have invented certain new and useful Improvements in a Butter Worker and Molder; and I do hereby declare that the following is a full and complete description of the construction and operation of the same, reference being had to the accompanying drawings, making a part of this specification, in which—

Figure 1 is a top view of the butter worker and molder. Fig. 2 is a longitudinal section.

Like letters of reference refer to like parts in the views.

My improvement relates to a combined butter worker and molder in which the butter can be thoroughly worked and then molded out with the greatest facility, as will be described.

A represents the body or frame of the worker, that consists of a bottom piece, A', wide at one end and tapering toward the other, with side-pieces, d d, closed at the narrow end, and a piece, b, across the top.

F is an arm, part of the worker, that has a handle on the outer end and the inner end, by means of a hook, J, secured in the frame, and an eye, J', attached to the end of the arm, is connected to the frame, thus forming a hinge, as shown at K in Fig. 2, in such a manner that it can be raised or moved along from one side to the other and turned over on the sides, as may be desired, in working the butter.

The butter-molds consist of a lever, H, connected at one end to the top piece, b, by means of a hook, g, and eye g', forming a hinge, N, whereby the lever can be moved out or turned entirely back out of the way.

h' is a button, which prevents the arm from coming unhooked. By turning this button it can be removed. The button h is for the same purpose in removing the arm F.

In a slot in the lever is pivoted the upper end or arm of the stamp L, (indicated by the dotted lines in Fig. 2,) that fits down into a mold, P, that can be placed underneath on the bottom A'. The lever H is formed into a handle at the outer end.

In using this butter worker and molder, when the butter is worked sufficiently with the arm F the mold P can be filled and the stamp pressed down onto the butter, thus shaping or molding and stamping it in one operation.

What I claim as my improvement, and desire to secure by Letters Patent, is—

The arm F, pivoted or hinged at K, and lever H, pivoted or hinged at N, in combination with the frame A, mold P, and stamp L, arranged as and for the purpose set forth.

T. D. SMITH.

Witnesses:
W. H. BURRIDGE,
E. E. WAITE.